United States Patent Office 3,021,357
Patented Feb. 13, 1962

3,021,357
DIALKYL ESTERS OF 5-t-ALKYLISOPHTHALIC ACID
Edward A. Swakon, Hammond, Ind., assignor to Standard Oil Company, Chicago, Ill., a corporation of Indiana
No Drawing. Filed Apr. 15, 1959, Ser. No. 806,464
3 Claims. (Cl. 260—475)

This invention relates to a novel class of compositions, which compositions are particularly suitable for use as synthetic liquid lubricants and plasticizers for synthetic polymeric resins.

An object of the invention is a composition suitable for use as a liquid lubricant alone or in combination with additives. Another object is a novel composition suitable for use as a plasticizer for synthetic polymeric resins such as polyvinyl chloride or polyacrylonitrile. A particular object is a liquid composition prepared by esterifying 5-t-alkylisophthalic acid with branched chain alcohol containing from 5 to 30 carbon atoms. Other objects will become apparent in the course of the description of the invention.

A novel composition of the invention is a compound of the formula

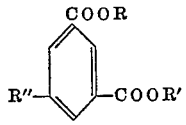

wherein R and R' are alkyl groups each containing from 5 to 30 carbon atoms and at least one of the carbon atoms is in a branched position and R" is a tertiary alkyl group containing from 4 to 30 carbon atoms.

This composition may also be described as the dialkyl ester of 5-t-alkylisophthalic acid wherein the t-alkyl group contains from 4 to 30 carbon atoms and each alkyl group contains from 5 to 30 carbon atoms and at least 1 of these carbon atoms is in a branched position.

The tertiary alkyl group is preferably t-butyl or t-amyl. It is to be understood that the preference for the number of carbon atoms in the tertiary alkyl group is dependent on the physical and chemical characteristics desired in the final dialkyl ester composition.

The alkyl groups are drived from monohydric alcohols which contain at least 1 carbon atom in a branched position and contain a total of from 5 to 30 carbon atoms. The branching may consist of only 1 carbon atom such as is present in isohexanol or may consist of 2 or more methyl groups in branched location. Or the branching may contain 2 or more carbon atoms such as in 2-ethylhexanol. Or the branching may contain a different number of carbon atoms such as methyl, ethyl, as in methylethylhexanol.

A preferred alcohol for the esterification product contains from 8 to 13 carbon atoms and is available commercially from the Oxo process. These alcohols are available commercially and are customarily designated by the number of carbon atoms present and the use of "iso" as a prefix thereto, for example, isooctyl, isononyl, and isotridecyl alcohols. These alcohols are made by the oxoation of mixtures of isomeric olefins. For example, isooctyl alcohol is made by oxoation of $C_7$ olefins derived from petroleum sources and which are a natural mixture of isomeric olefins. A particularly good description of these alcohols and the derivation thereof is contained in U.S. 2,751,361, issued on June 19, 1956; specifically the teachings which are incorporated herein by reference are contained in column 4, line 59 to column 5, line 45.

The dialkyl esters as hereinbefore defined are useful as plasticizers of a non-migratory character for use with synthetic polymeric resins such as polyvinyl chloride or styrene-acetonitrile. A particularly suitable use for the dialkyl esters defined hereinbefore is as liquid lubricants. These materials may be used as liquid lubricants in themselves or as the essential component of a lubricant containing additive of the type present in mineral oils today. Thus the liquid lubricant may be one wherein the present esters are blended with a minor percentage of additive compounds. Thus, the oxidative stability of the present esters can be increased by the use of from 0.1 to 10% by weight of an anti-oxidant, e.g., phenyl-a-naphthylamine, p-hydroxydiphenylamine, tertiary butylcatechol or the like. Improved anti-wear, or extreme pressure qualities can be imparted by the addition of from 0.1 to 10% of a material of the type of tricresyl phosphate, for example. The viscosity characteristics of the present esters can be improved by the addition of from 0.1 to 10% of a polymeric viscosity index improver such as, for example, a polymethacrylate (Acryloid), a silicone such as dimethyl-, diethyl- or methyl phenyl silicone, or an alkoxypolysiloxane. The composition can also be blended with minor amounts of other synthetic oils, such as the poly-1,2-oxyalkylene glycols and the ether and/or ester derivatives thereof. As rust inhibitors, there can be added from 0.1 to 10% of any one of several compounds including metal sulfonates such as zinc dipolypropene-benzene sulfonate, sodium white oil-benzene sulfonate, and the like.

Examples

Dialkyl esters of 5-t-butylisophthalic acid were prepared by introducing 5-t-butylisophthalic acid (5-t-butylbenzene-1,3-dicarboxylic acid) with the particular alcohol in toluene solution; paratoluene sulfonic acid in an amount of 1%, based on 5-t-butylisophthalic acid, was also present as a catalyst. The alcohol was charged in an excess of about 5 mol percent over the theoretical requirement. The reaction was carried out at the boiling point of the mixture in the vessel; water was continuously removed overhead along with toluene. In another procedure the methyl ester of the 5-t-butylisophthalic acid was used and methanol was continuously removed overhead during the reaction time. After water or methanol had ceased to come overhead, the reaction vessel was cooled. The final mixture was washed with water; then washed with dilute aqueous sodium bicarbonate solution; then again with water. The final water washed mixture was dried over potassium carbonate. The toluene present in the anhydrous material was removed by distillation and the ester product was recovered by distillation under vacuum.

Di(2-ethylhexyl) ester of 5-t-butylisophthalic acid was prepared from the methyl ester of the acid. Di(isooctyl) ester of 5-t-butylisophthalic acid was prepared from commercial iso-octyl alcohol derived from the Oxo process.

The inspection data on these two dialkyl esters is set out herein below.

| | Di(2-ethylhexyl) ester of 5-t-butylisophthalic acid | Di(isooctyl) ester of 5-t-butylisophthalic acid |
|---|---|---|
| Boiling point, ° C./mm.Hg | 240/3 | 238/2 |
| Pour point, ° F. | −45 | −30 |
| Flash point, ° F. | 480 | 490 |
| Viscosity, Cs.: | | |
| 100° F. | 93.8 | 118.6 |
| 210° F. | 8.0 | 9.1 |
| Viscosity index | 36 | 33 |

Thus having described the invention, what is claimed is:
1. The dialkyl ester of 5-t-alkylisophthalic acid wherein the t-alkyl group contains 4 carbon atoms and each alkyl group contains 8 carbon atoms and at least 1 of these carbon atoms is in a branched position.
2. Di(2-ethylhexyl) ester of 5-t-butylisophthalic acid.
3. Di(isooctyl) ester of 5-t-butylisophthalic acid.

References Cited in the file of this patent
UNITED STATES PATENTS

| | | |
|---|---|---|
| 2,706,735 | Ferstandig | Apr. 19, 1955 |
| 2,936,320 | Benoit | May 10, 1960 |

OTHER REFERENCES

Nightingale et al.: J. Am. Chem. Soc., vol. 64, 1664 (1942).

Smith et al.: Ind. Eng. Chem., vol. 42, 2576–79 (1950).